US008626811B2

(12) United States Patent
Lambert et al.

(10) Patent No.: US 8,626,811 B2
(45) Date of Patent: Jan. 7, 2014

(54) METHOD AND APPARATUS FOR PROVIDING FLEXIBLE BIT-LENGTH MODULI ON A BLOCK MONTGOMERY MACHINE

(75) Inventors: Robert John Lambert, Cambridge (CA); Yuri Poeluev, Waterloo (CA)

(73) Assignee: Certicom Corp., Mississauga (CA)

( * ) Notice: Subject to any disclaimer, the term of this patent is extended or adjusted under 35 U.S.C. 154(b) by 884 days.

(21) Appl. No.: 12/770,996

(22) Filed: Apr. 30, 2010

(65) Prior Publication Data
US 2011/0270906 A1 Nov. 3, 2011

(51) Int. Cl.
G06F 7/00 (2006.01)
G06F 7/38 (2006.01)
H04L 9/00 (2006.01)
H04L 9/38 (2006.01)
H04K 1/00 (2006.01)

(52) U.S. Cl.
USPC ............. 708/491; 708/492; 380/28; 380/255

(58) Field of Classification Search
USPC ............... 708/491–492, 620; 380/28, 30, 44; 713/189
See application file for complete search history.

(56) References Cited

U.S. PATENT DOCUMENTS

| | | | | |
|---|---|---|---|---|
| 5,144,574 A | * | 9/1992 | Morita | 708/491 |
| 5,499,299 A | * | 3/1996 | Takenaka et al. | 380/28 |
| 5,751,620 A | | 5/1998 | Monier | |
| 5,982,900 A | * | 11/1999 | Ebihara et al. | 380/30 |
| 6,175,850 B1 | * | 1/2001 | Ishii et al. | 708/491 |
| 6,356,636 B1 | | 3/2002 | Foster et al. | |
| 6,735,611 B2 | | 5/2004 | Vanstone | |
| 7,536,564 B2 | * | 5/2009 | Liardet et al. | 713/194 |
| 2004/0220989 A1 | * | 11/2004 | Elbe et al. | 708/492 |
| 2006/0064453 A1 | * | 3/2006 | Fischer et al. | 708/620 |
| 2006/0222175 A1 | * | 10/2006 | Itoh et al. | 380/28 |

(Continued)

FOREIGN PATENT DOCUMENTS

| | | |
|---|---|---|
| EP | 1845442 A1 | 10/2007 |
| EP | 1939838 A1 | 7/2008 |
| EP | 1975906 A1 | 10/2008 |
| WO | WO 2004/114124 A1 | 12/2004 |

OTHER PUBLICATIONS

Jinook Song and In-Cheol Park, "Division-less high-radix interleaved modular multiplication using a scaled modulus," 2011 International SoC Design Conference (ISOCC), pp. 215-218, Nov. 2011.*

(Continued)

Primary Examiner — Chuong D Ngo
Assistant Examiner — Matthew Sandifer
(74) Attorney, Agent, or Firm — Wilfred P. So; John R. S. Orange; Blake Cassels & Graydon LLP.

(57) ABSTRACT

Techniques are disclosed for utilizing a block Montgomery machine designed only to operate at a fixed block length to perform operations using non-block length (flexible)moduli. In one embodiment, a new modulus n' is obtained having a block length equal to the fixed block length of the Montgomery machine or a multiple thereof. At least one modular additive operation is performed with the new modulus n', and at least one modular multiplicative operation is performed with the non-block length modulus n. In this way, the result of the at least one additive operation is sufficiently reduced when a carry stems from the additive operation.

21 Claims, 7 Drawing Sheets

(56) References Cited

U.S. PATENT DOCUMENTS

| | | | |
|---|---|---|---|
| 2006/0235921 A1* | 10/2006 | Itoh et al. | 708/492 |
| 2007/0168411 A1* | 7/2007 | Hubert | 708/492 |
| 2007/0185948 A1* | 8/2007 | Elbe et al. | 708/400 |
| 2007/0260664 A1* | 11/2007 | Bertoni et al. | 708/490 |
| 2009/0086961 A1 | 4/2009 | Sauzet et al. | |
| 2010/0023571 A1* | 1/2010 | Furukawa et al. | 708/491 |
| 2010/0064142 A1* | 3/2010 | Matsuzaki | 713/189 |

OTHER PUBLICATIONS

Orup, H.; "Simplifying Quotient Determination in High-Radix Modular Multiplication"; 12$^{th}$ IEEE Symposium on Computer Arithmetic, Jul. 19 to 21, 1005; pp. 193 to 199; IEEE Computer Society Press.

Menezes, A. et al.; Handbook of Applied Cryptography; 1997; pp. 591 to 634; Chapter 14: Efficient Implementation; CRC Press, Boca Raton, Florida.

Verhoof, Paul; Search Report from corresponding European Application No. 10161699.3; search completed Sep. 16, 2010.

Mikkelsen, Gert; "Implementing Multi-Precision Modular Arithmetic From a Classical Approach to Montgomery Reduction"; Dec. 14, 2005.

Menezes, A. et al.; Handbook of Applied Cryptography; 1997; pp. 600 to 620; CRC Press, Boca Raton, Florida.

* cited by examiner

METHOD AND APPARATUS FOR PROVIDING FLEXIBLE BIT-LENGTH MODULI ON A BLOCK MONTGOMERY MACHINE

TECHNICAL FIELD

The following relates generally to methods and apparatuses for implementing modular arithmetic operations in a computing device, and has particular utility in computing devices used in cryptographic systems.

BACKGROUND

A cryptographic system is a computer system that uses cryptography, typically to secure or authenticate data communication between a pair of computing devices connected to one another through a data communication link in the system. Each computing device has a cryptographic unit with the processing capacity to implement one or more cryptographic protocols used to secure or authenticate the data communication. The cryptographic protocols typically perform arithmetic operations on the bit strings representing parameters in the protocols to produce a bit string representing the output from the protocol.

Computing devices in a cryptographic system are often required to perform arithmetic operations in which modular arithmetic is necessary. For example, a computing device may be required to multiply two integers modulo some n. The classical approach to performing this operation is to first perform the multiplication of the integers and then divide the product by the modulus n. The remainder from the division represents the modular reduction. However, performing the modular reduction of an integer by dividing the integer by the modulus n to obtain the remainder can be relatively computationally expensive. Therefore, other modular reduction techniques have been developed that attempt to increase the computational efficiency of modular reduction.

One such technique is the method of Montgomery modular reduction, referred to as Montgomery reduction for short. Montgomery reduction is known in the art and is discussed in detail, for example, in section 14.3.2 of the *Handbook of Applied Cryptography*, Menezes et al., CRC Press, 1997. Montgomery reduction benefits from the fact that steps of multiplication and shifting are generally faster than division on most computing machines. Montgomery reduction also relies on performing certain precomputations, and by doing so many calculations can be done faster. Also, as opposed to classical methods of reduction-from-above, such as Euclidean division, Montgomery reduction reduces from below, that is, the method proceeds by clearing the least-significant portions of the unreduced quantity, leaving the remainder in the upper portion, and therefore benefits from excluding carries that may otherwise interfere with the already cleared portion.

In Montgomery reduction, calculations with respect to a modulus n are carried out with the aid of an auxiliary number R called the Montgomery radix or base. R is chosen such that R>n and such that the greatest common divisor of R and n is one, i.e. $\gcd(R,n)=1$. When the modulus n is an odd (often prime) number, a good choice of R is typically the first convenient power of two larger than the modulus n; i.e., $R=2^r$, where r is an integer chosen such that R is the first convenient power of two greater than the modulus n. The Montgomery reduction of a number T is the quantity given by computing $TR^{-1} \bmod n$. This computation requires the values T, R, n, and $\mu=(-n)^{-1} \bmod 2^w$, where w is an integer, typically representing the bit size of a word (or block) of the value being operated on. The value $\mu$ is used to effect the Montgomery reduction. A summary of Montgomery reduction follows.

A computational engine performing Montgomery reduction receives as an input the modulus n, precomputed values $R=2^r$ and $\mu$, and the integer T on which Montgomery reduction is to be performed. For Montgomery reduction to operate correctly, the property must hold that $\gcd(n,R)=1$ and $T<nR$. The computational engine performs the following computations to obtain the value $TR^{-1} \bmod n$:

1. $A \leftarrow T$ (Notation: $A=(a_{2d-1} \ldots a_1 a_0)_b$ where $b=2^w$ and d is the number of words of the modulus n—note that $d=r/w$).
2. For $i=0$ to $d-1$ do the following:
   2.1 $u_i \leftarrow a_i \mu \bmod b$
   2.2 $A \leftarrow A + u_i n b^i$
3. $A \leftarrow A/b^d$
4. If then $A \leftarrow A-n$
5. Return (A).

The value A returned equals $TR^{-1} \bmod n$.

It is noted that sometimes the final reduction (step 4) in Montgomery reduction is omitted, for example, to counter side channel attacks if the modulus n is secret. In such a scenario, the value returned $TR^{-1}$ is not fully reduced mod n, but is equivalent to the fully reduced value (mod n). That is, the output of the Montgomery reduction is a value that is congruent to $TR^{-1} \bmod n$ modulo n.

The technique of Montgomery multiplication is also known in the art and is described, for example, in section 14.3.2 of the *Handbook of Applied Cryptography*, Menezes et al., CRC Press, 1997. The Montgomery multiplication of two numbers a and b is the Montgomery reduction of their product, computed as $a \otimes b = abR^{-1} \bmod n$. Techniques such as Montgomery exponentiation, described in section 14.6.1 of the *Handbook of Applied Cryptography*, Menezes et al., CRC Press, 1997, utilize Montgomery multiplication to increase computational efficiency. A summary of Montgomery multiplication follows.

A computational engine performing Montgomery multiplication receives as an input the modulus n, precomputed values $R=2^r$ and $\mu$, and the integers x and y on which Montgomery multiplication is to be performed. For Montgomery multiplication to operate correctly, it must be the case that $\gcd(n,R)=1$. It is usual that $0 \leq x,y < n$. The computational engine performs the following computations to obtain the value $xyR^{-1} \bmod n$:

1. $A \leftarrow 0$ (Notation: $A=(a_d a_{d-1} \ldots a_1 a_0)_b$ where $b=2^w$ and d is the number of words of the modulus n—note that $d=r/w$).
2. For $i=0$ to $d-1$ do the following:
   2.1 $u_i \leftarrow (a_0 + x_i y_0) \mu \bmod b$
   2.2 $A \leftarrow (A + x_i y + u_i n)/b$
3. If $A \geq n$ then $A \leftarrow A-n$
4. Return (A).

The value A returned is $xyR^{-1} \bmod n$.

As with Montgomery reduction, the final reduction (step 3) in Montgomery multiplication may be omitted if side channel attacks are a concern. In this case, the output of the Montgomery reduction is a value congruent to $xyR^{-1} \bmod n$ modulo n.

Typically, calculations using Montgomery reduction are carried out on numbers in their Montgomery form. The Montgomery form of a number a is computed as $\hat{a}=aR \bmod n$. Modular addition or subtraction (modulo n) of values in Montgomery form produces results in Montgomery form. Additionally, Montgomery multiplication of values in Montgomery form also produces values in Montgomery form, i.e., $\hat{a} \otimes \hat{b} = aR \cdot bRR^{-1} \bmod n = abR \bmod n$. Conveniently, conversion to Montgomery form may be carried out via the Montgomery multiplication $\hat{a}=a \otimes R^2 = aR \bmod n$, and conversion from Montgomery form back to regular (non-Montgomery) or canonical form may be carried out by either the Montgomery reduction: $âR^{-1}$ mod n=a mod n, or by the Montgomery multiplication: $â \otimes 1 = aRR^{-1} = a$ mod n.

A computing device in a cryptographic system will often have a computational engine for calculating the Montgomery product of two numbers. This computational engine is typically referred to as a Montgomery machine or Montgomery engine. The machine may be implemented in a hardware or software module, and is configured to operate on a set of parameters to produce a result. For example, the machine may perform the Montgomery multiplication on two inputs a and b and output the result $a \otimes b$. Such a Montgomery machine can therefore also be used to convert to and from Montgomery form and to perform Montgomery reduction. For converting to Montgomery form, the machine accepts a and $R^2$ as inputs and computes the output $â = a \otimes R^2 = aR$ mod n. Conversely, for converting back to canonical form, the machine accepts a and 1 as inputs and computes the output $â \otimes 1 = a$. To calculate the Montgomery reduction of â value a, the machine accepts a and 1 as inputs and computes $a \otimes 1 = aR^{-1}$ mod n as the output.

The Montgomery machine is typically provided with the value of the modulus n and perhaps the value of the Montgomery radix R (or an equivalent value such as r). The machine then computes the value $\mu$, which is utilized as a precomputed value in subsequent operations. Alternatively, the Montgomery radix R may instead be computed by the machine and/or the value $\mu$ may instead be provided to the Montgomery machine. The value $R^2$ is then computed from the Montgomery radix $R=2^r$ and stored for use by the Montgomery machine to convert numbers into their Montgomery form. Note that R is a fixed point of Montgomery multiplication (i.e. $R \otimes R=R$) and therefore it is not possible to obtain $R^2$ mod n by simply performing the Montgomery multiplication of R with itself. The computation of $R^2$ mod n can instead be performed by utilizing a series of addition and multiplication/squaring operations. For example, one way to perform the computation is as follows: (1) start with the value $R=2^{r-1}$; (2) add this value to itself: $(2^{r-1}+2^{r-1})$ mod $n=2^r$ mod n; (3) add the resulting value to itself: $(2^r$ mod $n+2^r$ mod n)mod $n=2^{r+1}$ mod n; (4) square the resulting value using Montgomery multiplication: $2^{r+1}$ mod $n \otimes 2^{r+1}$ mod $n=2^{r+2}$ mod n; and (5) continue squaring the resulting value via Montgomery multiplication until the value $2^{r+r/2}$ mod $n \otimes 2^{r+r/2}$ mod $n=2^{r+r}$ mod $n=R^2$ mod n is obtained.

The computation of $R^2$ mod n utilizing a series of addition and multiplication/squaring operations, such as those described above, is known in the art. Many variations are also known, including variations that modify the order in which the adding and multiplying/squaring is performed. For example, one variation of performing the computation $R^2$ mod n is as follows: (1) calculate the two's complement of n: R−n; (2) add this value to itself to yield (R−n)+(R−n)=(2R) mod n; and (3) multiply (2R)mod n by itself r times using Montgomery multiplication to yield $R^2$ mod n:

$$(2R) \bmod n \otimes (2R) \bmod n \otimes \ldots \otimes (2R) \bmod n = (2R \bmod n)^r_\otimes = R^2 \bmod n.$$

Many variations for computing $R^2$ mod n are known in the art, two of which are shown above. In all of these variations, a series of addition and multiplication and/or squaring operations are performed. Also, in all of these variations, if the final reduction step is omitted in the Montgomery multiplication operations, the value $R^2$ computed may not be fully reduced (i.e. it may not be $R^2$ mod n per se), but it will be congruent to $R^2$ mod n modulo n.

Typically, Montgomery machines are limited only to performing operations with moduli of a fixed bit-length, or multiples of this length. Such machines are referred to as block Montgomery machines. The block-length of a block Montgomery machine is often 32, 64, 128 or 256 bits, with allowable bit-lengths for the moduli consisting of multiples of this block length. Such a structure is disadvantageous when implementing schemes that use moduli having bit lengths not equal to the fixed bit-length of the Montgomery machine (or a multiple thereof).

BRIEF DESCRIPTION

Embodiments will now be described by way of example only with reference to the accompanying drawings in which.

DETAILED DESCRIPTION

Figure 1:
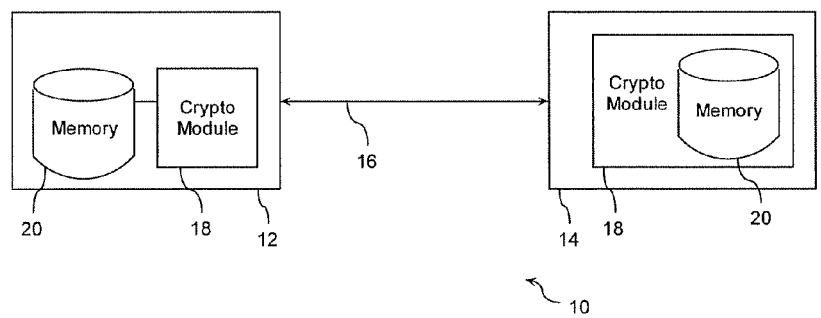
FIG. 1 is a schematic block diagram of a cryptographic communication system.

It has been recognized that Montgomery machines having a fixed block length present difficulties whenever arithmetic operations with respect to moduli of other bit lengths are required, whether for calculations in Rivest-Shamir-Adleman (RSA), the digital signature algorithm (DSA), or Diffie-Hellman (DH) cryptographic schemes at these non-block-length moduli, or for computation of points in elliptic curves (EC) or hyper elliptic curves HEC, together referred to as (H)EC. Specifically, it has been recognized that if a block Montgomery machine is used with a modulus n that has a bit length that is not equal to the block length of the Montgomery machine (or its multiple), then in some modular operations (e.g. modular addition or modular subtraction) in which the result contains a carry/borrow out of the upper block (i.e. when the result becomes bigger than the maximum allowed by the machine), the step of automatically subtracting or adding the modulus n once is not necessarily sufficient since n will not have the required top bit set in the uppermost block. The result will therefore not be sufficiently reduced and subsequent calculations may then be incorrect.

For example, the National Institute of Standards & Technology (NIST) standards contain ECC point-order moduli at 521 bits. A block Montgomery machine as described earlier, designed for fixed moduli that are multiples of a typical binary-power block length (16 bits, 32 bits, etc.) cannot directly be used for modular calculations at an unsupported bit-length, such as at 521 bits. If such a block Montgomery machine is operated with the 521 bit-length modulus n, then during some of the modular operations in which the result contains a carry/borrow out of the upper block, the step of automatically subtracting or adding the modulus n once is not necessarily sufficient since n will not have the required top bit set in the uppermost block. The result will not be sufficiently reduced by the addition/subtraction of n and subsequent calculations may then be incorrect.

Therefore, in general terms, the following provides a method and apparatus for utilizing a block Montgomery machine designed only to operate at a fixed block length to perform operations using non-block length (flexible)moduli. For example, it has been recognized that when performing multiplicative operations using a block Montgomery machine having a fixed block length, the non-block length modulus can be directly utilized to produce correct values. For additive operations (e.g. addition and subtraction), a shifted or scaled modulus can be obtained and used. As an example, methods of computing the $R^2$ value using the non-block length and shifted moduli are provided.

As will also be described in detail below, for a sequence of modular operations employing the flexible moduli, where the machine maintains the results in Montgomery form, a shifted or scaled modulus and corresponding precomputed Montgomery values yield correct and efficient sequential computations.

By utilizing the described techniques, an existing or standard Montgomery machine can be used to support non-block length moduli calculations.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that that any module, component, or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Referring first to FIG. 1, a cryptographic system 10 generally comprises a first correspondent 12 that communicates with a second correspondent 14 over a communication channel 16. The correspondents 12 and 14 are data communication devices such as computers or computing devices, mobile devices, PDAs, etc., that respond to user inputs to configure and transmit messages. Each correspondent includes a cryptographic unit or module 18, which either has its own memory 20 for storing inputs, outputs and intermediate portions of cryptographic operations, or has access to an external memory 20 that is part of the correspondent (12, 14). It can be seen that in the embodiment shown in FIG. 1, the first correspondent 12 includes a memory 20 external to the cryptographic module 18 and the second correspondent 14 includes memory 20 that is internal to the cryptographic module 18 to illustrate that the capability to store data can be provided in any suitable arrangement. It will also be appreciated that the memory 20 can be external to and accessible (e.g. via a network connection etc.) to the correspondent 12, 14 (not shown) if necessary or desired.

The cryptographic module 18 is configured to perform cryptographic operations such as encryption/decryption, signing and modular arithmetic, etc. For the purposes of illustration, it will be assumed that the cryptographic module 18 is configured for performing elliptic curve cryptographic (ECC) operations, although it will be appreciated that operations based on other underlying groups used in cryptographic systems may be utilized.

Figure 2:
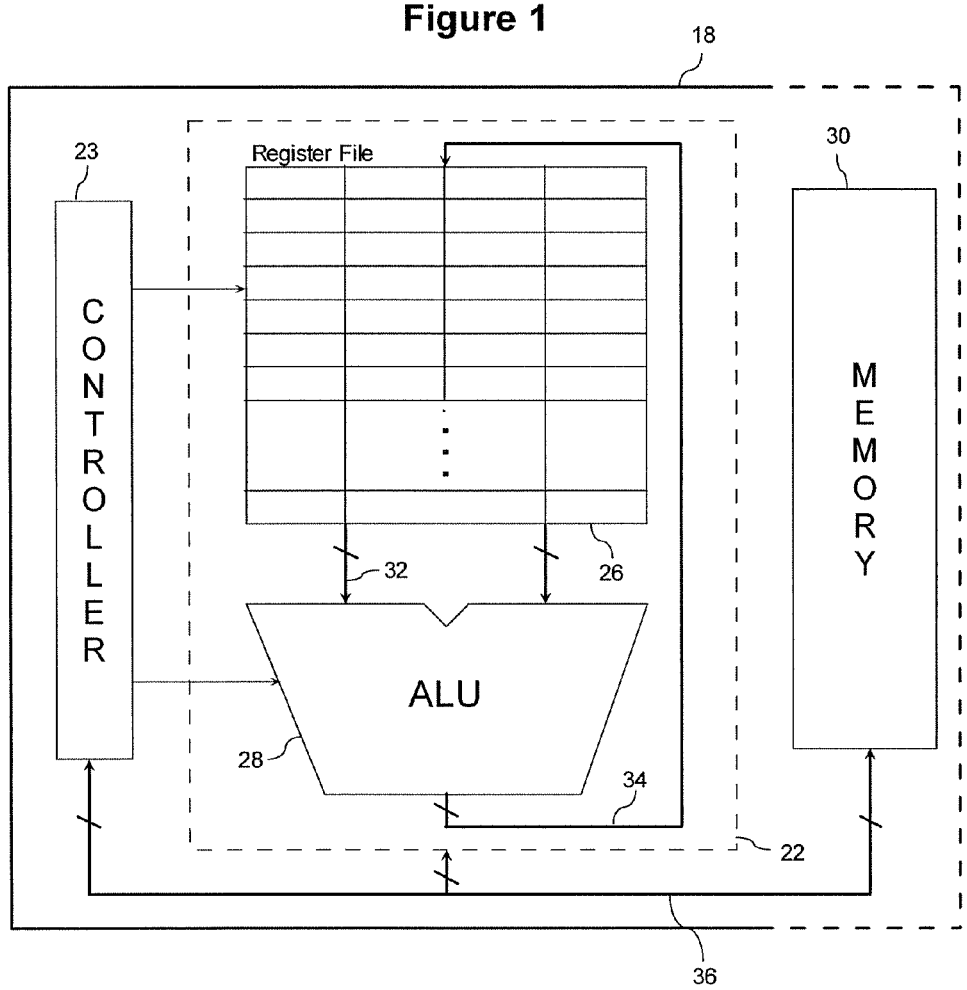
FIG. 2 is a schematic block diagram of the cryptographic module of FIG. 1 having a block Montgomery machine.

The cryptographic module 18 includes a block Montgomery machine 22 (also called a block Montgomery engine 22), further details of which are shown in FIG. 2. It will be appreciated that the cryptographic module 18 and any component thereof may be implemented as an apparatus in either hardware or software (computer readable instructions stored on a computer readable medium).

As can be seen in FIG. 2, the cryptographic module 18 includes a controller 23, the block Montgomery machine 22, and a memory 30. The block Montgomery machine 22 comprises a register file 26 and an arithmetic logic unit (ALU) 28.

It will be appreciated that the memory 30 may instead be included in the machine 22, rather than external to the machine 22 as illustrated. It will also be appreciated that the memory 30 may comprise all or part of the memory 20 (shown in FIG. 1) or may be provided as a separate component in the cryptographic module 18 as shown. The memory 30 may include random access memory (RAM), read only memory (ROM) and/or any other type of suitable memory structure.

The register file 26 comprises a group of general purpose registers, which can be used as intermediate storage for cryptographic operations performed for and by the cryptographic module 18. The register file 26 communicates with the ALU 28 via data input buses 32. The ALU 28 comprises integer arithmetic circuitry. A data output or result bus 34 is provided from the ALU 28 to the register file 26 for writing results of computations performed in the ALU 28 to the register file 26.

Computational operations of the ALU 28 are controlled via programmed instructions residing in or accessible to the controller 23. A memory bus 36 is also provided to enable the controller 23 and the machine 22 to utilize memory 30 when performing and outputting results of the cryptographic operations. Typically, the machine 22 is utilized in an existing host computer system and the controller 23 receives control signals from the host system and communicates data to the register file 26 and ALU 28.

The general purpose registers that make up the register file 26 are made up of a certain number of blocks, each having a fixed length, e.g. 128 bits. As is known in the art, the blocks are used to store data during computations; i.e., the block computations are performed, intermediate results are stored in a combination of registers and memory, and the complete multi-block computation is built up from block-length component computations.

The machine 22 is configured to convert numbers into Montgomery form, perform modular arithmetic operations (e.g. additive and multiplicative operations) on values in Montgomery form, and convert the results out of Montgomery form. The components and digital logic necessary for implementing such operations are known in the art, and it will be appreciated that FIG. 2 does not illustrate all of the components and logic necessary for performing such operations. On the contrary, FIG. 2 has been simplified for the purposes of illustration. The ALU 28 shown in FIG. 2 is used to perform modular addition and/or modular subtraction and is utilized during the execution of Montgomery multiplication.

The ALU 28 is of a fixed length, typically 16, 32, 64, etc. bits. To perform, for example, the addition of two values stored in the register file 26, first the low-order blocks of the two values are added. The resulting block-carry is incorporated into the addition of the next-order blocks, which will result eventually in a possible block-carry emanating from the highest order blocks of the input. When implementing modular addition, the highest order block carry triggers a subtraction by the modulus n. Assuming the bit length of n is equal to the block length of the machine 22 (i.e., assuming n has the uppermost bit of the uppermost block equal to one), the automatic subtraction by the modulus n is sufficient to reduce the value of the addition modulo n. A similar situation occurs for modular subtraction, in which the highest order block borrow can is made to trigger an automatic addition of n. Therefore, it can be seen that if the bit length of n is not equal to the block length of the machine 22, carries/borrows stemming from the uppermost block may not be reduced by the addition/subtraction of n, which may result in a value that is not sufficiently reduced (i.e., that is not less than the value n).

During operation, the Montgomery machine 22 typically first goes through an initialization process in which values μ and $R^2$ mod n are computed, so that these values can be stored and subsequently used as precomputed values in performing Montgomery multiplication and in converting canonical values into Montgomery form. In order to compute p and $R^2$ mod n, the Montgomery machine 22 first obtains the modulus n and Montgomery radix R (or an equivalent value such as r). For example, the modulus n may have been input by a user and transferred from memory of the cryptographic module 18 to the machine 22. The Montgomery radix R may have also been input by a user, or instead generated by the Montgomery machine 22 as $R=2^r$, where r is an integer generated such that R is the first convenient power of two greater than the modulus n.

The value μ is then computed by the machine 22 as $\mu=(-n)^{-1}$ mod $2^w$, as described earlier. In an alternative embodiment, μ can instead be provided to the machine 22.

Next, $R^2$ mod n is computed. As explained earlier, the calculation of $R^2$ mod n involves a series of modular addition and multiplication/squaring operations. Therefore, when $R^2$ mod n is calculated via modular addition and multiplication/squaring operations, if the bit length of the modulus n is not equal to the block length of the machine 22, then carries stemming from the uppermost block may not be sufficiently reduced by adding/subtracting the modulus n.

It has been recognized that this problem can be obviated by generating and utilizing a new block-length modulus n' to perform modular additions/subtractions, while still performing Montgomery multiplication/squaring using the original non-block-length modulus n for the multiplication/squaring operations.

The new modulus n' is generated by the cryptographic module 18 to have a bit length equal to the block length of the machine 22, and can be obtained, for example, directly from modulus n. For example, block-length modulus n' can be obtained by simply shifting (multiplying by 2) the modulus n until the most-significant bit of the most-significant block becomes a one. Alternatively, if n is odd, an odd modulus n' can be obtained using n by performing the computation n'=kn, where k is an odd integer and is chosen to yield a modulus n' having a bit length equal to the block length, or instead by performing the calculation $n'=(2^s+C)n$, where C is a small odd integer (e.g. 1) and where s is an integer chosen to yield a modulus n' having a bit length equal to the block length. In some embodiments, k and/or s can be generated randomly, in which case the variation in the resulting computations may be employed as a countermeasure against leakage of the operand values as they undergo computation in the machine 22. It will be appreciated that n' may be calculated once and then stored (for example in memory 30) and retrieved whenever a modular addition/subtraction is required, or that instead n' may be generated directly from n each time a single (or sequence of) modular addition/subtraction operations are required.

Figure 3:
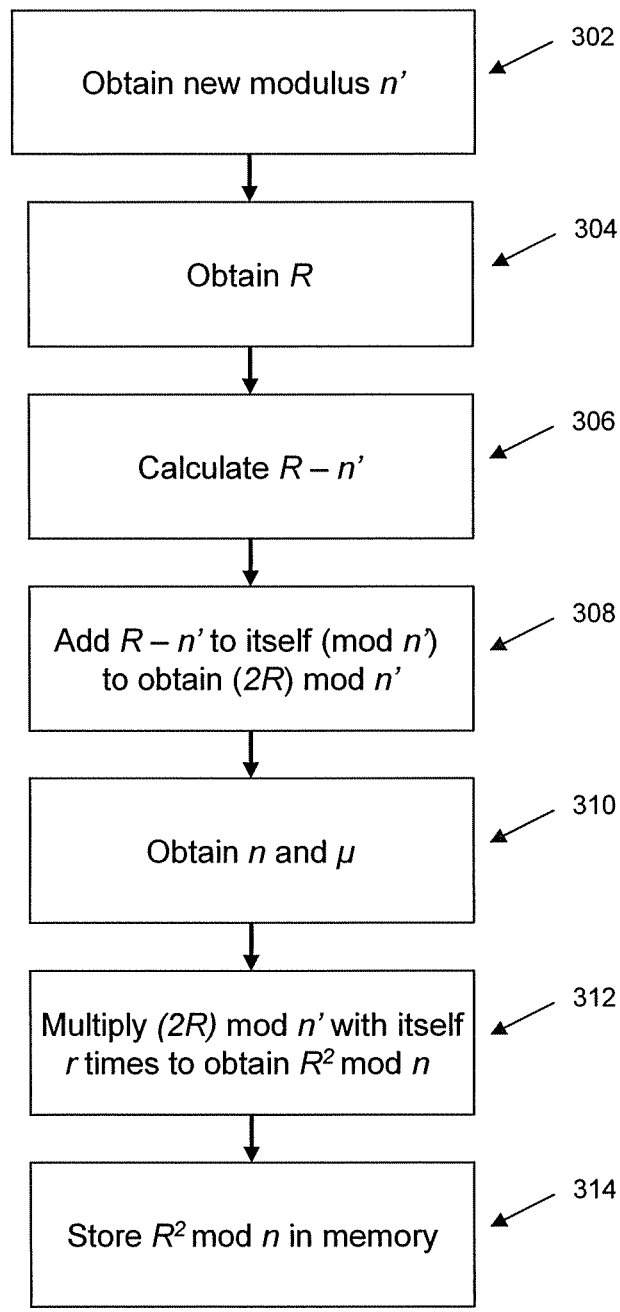
FIG. 3 is a schematic of an embodiment of a method of calculating the value $R^2$.

With reference to FIG. 3, an embodiment of a method of calculating the value $R^2$ mod n will now be described in which the modulus n has a bit length less than the block length of the block Montgomery machine 22. In this embodiment, for the purposes of illustration, it is assumed that the block length of the machine 22 is 16 bits, and that the modulus is n=1549, which is 11 bits long ($1549=11000001101_2$). It will be appreciated, of course, that this block length and modulus is chosen to simplify illustration. Typically, ECC operations will be calculated in the 100's of bits and RSA/DSA/DH operations will be calculated in the 1000's of bits.

Figure 4:
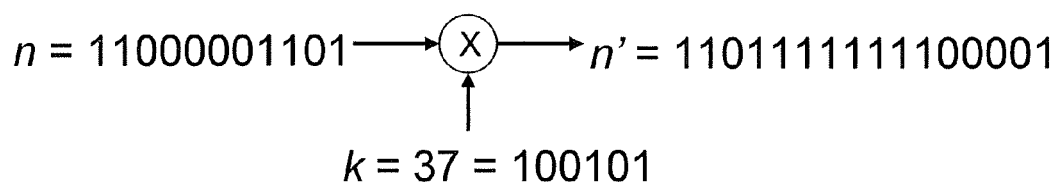
FIG. 4 is a schematic block diagram showing the conversion of a non-block-length modulus into a new modulus having a bit length equal to a block length of a Montgomery machine.

Turning therefore to step 302, the cryptographic module 18 first operates upon the modulus n to obtain a block-length odd modulus n' that has a length of 16 bits (the block length of the machine 22). For example, in one embodiment, the modulus n is multiplied by k=37 to obtain n'= $37(1549)=57313=1101111111100001_2$, as shown in FIG. 4.

Next, in step 304, a value R is obtained by the cryptographic module 18 for use in the Montgomery operations. In this embodiment, the value R is computed as the first convenient power of two greater than the modulus n'. Therefore, $R=2^r=2^{16}$. Note that this value of R still satisfies the criteria that R>n' and gcd(R,n')=1.

The value $R^2$ mod n is then calculated using a series of addition/multiplication steps in which modular addition is performed using the block-length modulus n' and in which Montgomery multiplication is performed using the original modulus n. As described earlier, there are many different ways to obtain $R^2$ mod n using a series of additions and multiplications. One such way is outlined in steps 306 to 312 below.

In step 306, the machine 22 first generates the two's complement of n' by performing the computation R−n'=8223. Then, in step 308, this value is added to itself using modular addition in the ALU 28 to obtain ((R−n')+(R−n'))mod n'=(2R) mod n'=16446. Note that R−n' is used instead of R itself since R−n' has a bit length that does not exceed 16 bits (unlike R before reduction, which is 17 bits). Conveniently, since the block Montgomery machine 22 operates using the block-length modulus n', if there are carries stemming from the uppermost block when calculating (R−n')+(R−n'), the value will be sufficiently reduced by the automatic subtraction of the modulus n'.

Next, in step 310 the cryptographic module 18 then retrieves the original modulus n and calculates the corresponding $\mu=(-n)^{-1}$ mod $2^w$, or this may instead be provided as an initial input to the machine 22 by the cryptographic module 18.

Then, in step 312, the value (2R)mod n' from step 308 is multiplied by itself r=16 times using Montgomery multiplication with the original modulus n to obtain $R^2$ mod n; i.e., $(2R \bmod n')_\otimes^r = R^2 \bmod n=781$ This is computed as follows:

$$(2R \bmod n') \otimes (2R \bmod n') = (2R \bmod n')(2R \bmod n')(R^{-1}) \bmod n = 4R \bmod n;$$

$$(4R \bmod n) \otimes (2R \bmod n') = (4R \bmod n)(2R \bmod n')(R^{-1}) \bmod n = 8R \bmod n;$$

...

$$((2^{r-1})R \bmod n) \otimes (2R \bmod n') =$$

$$((2^{r-1})R \bmod n)(2R \bmod n')(R^{-1}) \bmod n = R \cdot R \bmod n = R^2 \bmod n.$$

Finally, in step 314 the value $R^2$ mod n=781 is stored in memory 30 for subsequent use in converting values to Montgomery form. The value R mod n may also be computed, if desired, by performing in the machine 22 the computation $$R^2 \bmod n \otimes 1 = (R^2 \bmod n) \cdot 1 \cdot R^{-1} \bmod n = 478.$$

In the embodiment shown in FIG. 3, it will be appreciated that the final reduction step in the Montgomery multiplication operations may be omitted, in which case the value $R^2$ obtained at the end of step 312 will not be fully reduced (i.e. it will not be $R^2$ mod n=781 per se), but will be congruent to $R^2$ mod n=781 modulo n. If desired, further operations can be performed to reduce the magnitude of $R^2$ mod n. For example, a given value of $R^2$ can be replaced by $(R^2 \otimes R^2) \otimes 1$, which is often smaller than $R^2$ if $R^2$ was not already minimal.

It can therefore be seen from the method in FIG. 3 that the block Montgomery machine 22 utilizes the block-length modulus n' when performing modular addition operations, and the machine 22 utilizes the original modulus n when performing Montgomery multiplication operations. It has been recognized that the modulus n', which has a bit length equal to the block length of the machine 22, can be used to ensure that carries stemming from the uppermost block during modular addition/subtraction are sufficiently reduced via the automatic single addition/subtraction of the modulus. However, it has also been recognized that due to the structure of the algorithm for performing Montgomery multiplication, the Montgomery multiplication does not require a modulus n' having a bit length equal to the block length of the machine 22 to obtain a correct output, but instead can operate using the original modulus n.

Figure 5:
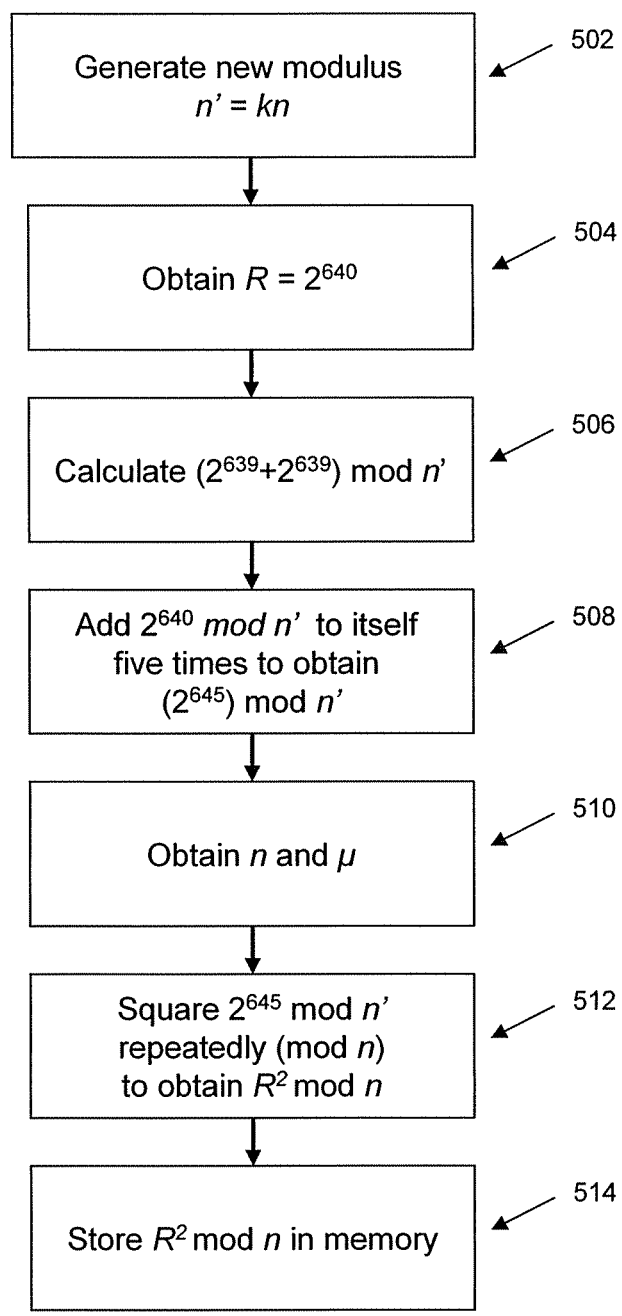
FIG. 5 is a schematic of another embodiment of a method of calculating the value $R^2$.

Turning now to FIG. 5, another embodiment of a method of calculating the value $R^2$ mod n will be described in which the modulus n has a bit length less than a multiple of the block length of the block Montgomery machine 22. In this embodiment, the block length of the block Montgomery machine 22 is 128 bits, and therefore the machine 22 is designed to operate with a modulus having a bit length that is a multiple of 128 bits. However, advantageously, the cryptographic module 18 uses this machine 22 to perform modular arithmetic operations using a modulus n that has a bit length of 521 bits, as described in the steps below.

First in step 502, the cryptographic module 18 operates on the modulus n to obtain a block-length modulus n' that has a bit length equal to 640 bits, which is the first multiple of 128 greater than 521 (128×5=640 bits). For example, in one embodiment, the modulus n has the value (in hexadecimal): n=0x1ffffffffffffffffffffffffffffffffffffffffffffffffffff-fa51868783bf2f966b7fcc0148f709a5d03bb5c968899c47a-ebb6fb71e913864098.

An odd random value k is generated having an appropriate value such that kn is 640 bits long. For example, in one embodiment, the value k=0x688a7fe8015bd7e31b0f2dec5f19bd is generated, and n'=kn is computed to obtain n'=0xd114ffd002b7afc6361e5bd8be33b5ffffffffffffffffff-ffffffffffffffdae0bc2de2a1d46c7fc8e517744d9ab4c0337-7c33a67d8689beb5b52edae50e480e32sf21a47124c064a-00f285974b3.

Next, in step 504, a value R is generated by the cryptographic module 18 for use in the Montgomery operations. The value R is computed as the first convenient power of two greater than the modulus n'. Therefore, $R=2^r=2^{640}$.

The value $R^2$ mod n is then calculated using a series of addition/multiplication steps in which modular addition is performed using the block-length modulus n' and in which Montgomery multiplication is performed using the original modulus n. As described earlier, there are many different ways to obtain $R^2$ mod n using a series of additions and multiplications. Another such way is outlined in steps 506 to 512 below.

First, in step 506, the value $s=2^{639}$ is added to itself modulo n', that is, (s+s)mod $n'=2^{640}$ mod n'. Note that the value s is used since it has a bit length that does not exceed 640 bits (unlike R before reduction, which is 641 bits long). Conveniently, since the block Montgomery machine 22 operates using the block-length modulus n', if there are carries stemming from the uppermost block when calculating s+s, the value will be sufficiently reduced by the automatic subtraction of the modulus n'.

Next, in step 508, the value $2^{640}$ mod n' is added to itself 5 times using modular addition modulo n' to obtain ($2^{640}$ mod $n'+2^{640}$ mod $n'+2^{640}$ mod $n'+2^{640}$ mod $n'+2^{640}$ mod $n'+2^{640}$ mod n')mod $n'=2^{645}$ mod n'. As with step 506, since the block Montgomery machine 22 operates using the block-length modulus n', if there are carries stemming from the uppermost block when calculating this addition, the value will be sufficiently reduced by the automatic subtraction of the modulus n'.

Next, in step 510, the cryptographic module 18 then retrieves the original modulus n. The machine 22 then calculates the corresponding $\mu=(-n)^{-1}$ mod $2^w$, or this may instead be provided as an initial input to the machine 22 by the cryptographic module 18.

Then, in step 512, the value $2^{645}$ mod n' from step 508 is squared repeatedly using Montgomery multiplication until the value $2^{640+640}$ mod $n=R^2$ mod n is obtained. Specifically, this is computed as follows:

$$(2^{645} \bmod n') \otimes (2^{645} \bmod n') =$$

$$(2^{645} \bmod n')(2^{645} \bmod n')R^{-1} \bmod n = 2^{640+10} \bmod n;$$

$$(2^{640+10} \bmod n) \otimes (2^{640+10} \bmod n) =$$

$$(2^{640+10} \bmod n)(2^{640+10} \bmod n)R^{-1} \bmod n = 2^{640+20} \bmod n;$$

$$(2^{640+20} \bmod n) \otimes (2^{640+20} \bmod n) =$$

$$(2^{640+20} \bmod n)(2^{640+20} \bmod n)R^{-1} \bmod n = 2^{640+40} \bmod n;$$

...

$$(2^{640+320} \bmod n) \otimes (2^{640+320} \bmod n) =$$

$$(2^{640+320} \bmod n)(2^{640+320} \bmod n)R^{-1} \bmod n = 2^{640+640} \bmod n = R^2 \bmod n.$$

Finally, in step 514 the value $R^2$ mod n is stored in memory 30 for subsequent use in converting values to Montgomery form.

It will be appreciated that in the embodiment shown in FIG. 5 the final reduction step in the Montgomery multiplication operations may be omitted, in which case the value $R^2$ obtained at the end of step 512 will not be fully reduced (i.e. it will not be $R^2$ mod n), but will be congruent to $R^2$ mod n modulo n.

As with the method of FIG. 3, in the method of FIG. 5 the block Montgomery machine 22 utilizes the block-length modulus n' when performing modular addition operations, and the machine 22 utilizes the original modulus n when performing modular Montgomery multiplication operations.

The embodiments shown in FIGS. 3 and 5 are specific examples in which the cryptographic module 18 obtains the value $R^2$ mod n using a block Montgomery machine 22 having a block length that is not equal to (or a multiple of) the modulus n. $R^2$ mod n can be computed using many variations of the modular addition and multiplication algorithms shown in FIGS. 3 and 5, all of which involve a series of modular addition and/or subtraction operations and a series of multiplication and/or squaring operations. It will be appreciated that the method embodied by FIGS. 3 and 5 can be generalized to any such variation of computing $R^2$ as follows: (1) generate a shifted modulus n' having a bit length equal to the bit length of the block Montgomery machine 22 (or a multiple thereof); and (2) calculate $R^2$ using the modulus n' to perform each modular additive operation and the original modulus n to perform each Montgomery multiplicative operation. Advantageously, the methods described with reference to FIGS. 3 and 5 involve first performing a series of additive operations using the block length modulus n', and then performing a series of multiplicative operations using the original modulus n, rather than switching back and forth between the two moduli. This is particularly advantageous if the machine 22 has only a single register for storing modulus values.

The embodiments described above disclose methods for computing the value $R^2$ using a block Montgomery machine 22 having a block length that is not equal to (or a multiple of) the bit length of the modulus n. Upon completion of the calculation of $R^2$, the Montgomery machine 22 finishes its initialization process. $\mu=(-n)^{-1}$ mod $2^w$ and $R^2$ have been computed and can now be used as precomputed values to perform subsequent operations in the Montgomery machine 22 and to convert values into their Montgomery form.

Therefore, subsequently, the Montgomery machine 22 performs a series of arithmetic operations using the original non-block length modulus. Most or all of these operations will be multiplicative, and therefore using the non-block length modulus n does not pose a problem. However, some of these operations may be additive (e.g. when operating on points of an elliptic curve). Nevertheless, it is typically assumed that the values being added are small enough and that the number of consecutive additive operations between a multiplicative operation are few enough such that a carry will not be required. This cannot be assumed when calculating $R^2$ due to the relatively large values of entities being added, but is often safe to assume when subsequently performing a series of arithmetic operations using the machine 22. With such an assumption, it is therefore possible to perform arithmetic operations using the non-block length modulus n. The p and $R^2$ values computed as described earlier are used as precomputed values by the machine 22 in performing such arithmetic operations.

Figure 6:
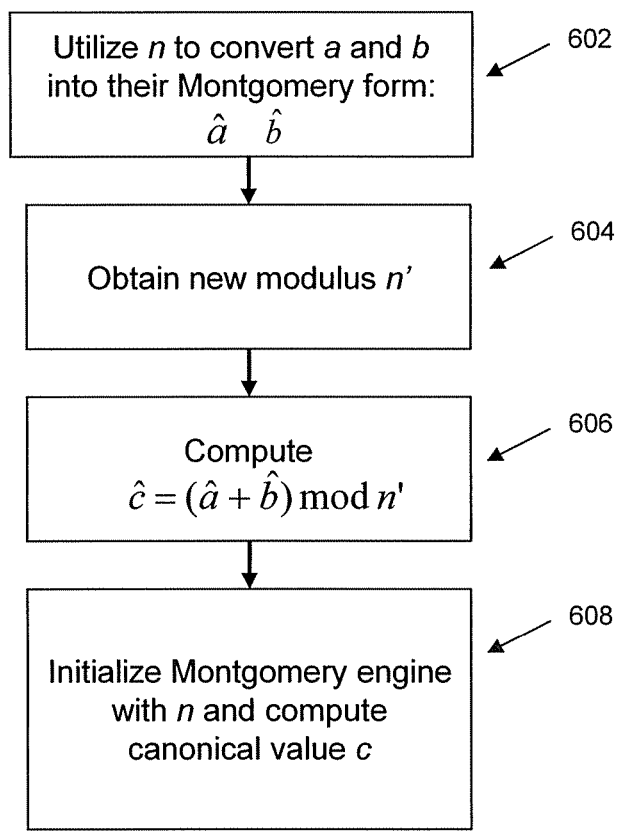
FIG. 6 is a schematic of an embodiment of a method of calculating a single atomic modular operation.

However, it may be the case that the machine 22 is required to perform a single additive operation, or perhaps a series of consecutive additive operations, and that it cannot be assumed that there will not be a carry. In this case, the additive operation(s) can be performed using the shifted modulus n'. For example, an embodiment is shown in FIG. 6 in which two values a and b are added modulo n.

First, in step 602, the Montgomery machine 22 utilizes the modulus n to convert the values a and b into their Montgomery form by performing the Montgomery multiplications $\hat{a}=a \otimes R^2$ mod $n=a(R^2$ mod n mod n=aR mod n and $\hat{b}=b \otimes R^2$ mod n=b($R^2$ mod n mod n=bR mod n. The precomputed value $R^2$ mod n required by the machine 22 for this computation is computed during initialization, for example, using the method of FIG. 3 or FIG. 5.

Assume a modular addition is required. Therefore, in step 604, the block-length modulus n' is retrieved from memory 30 or is calculated from n, for example, in the manner shown in step 302 of FIG. 3 or step 502 FIG. 5.

Next, in step 606, the values $\hat{a}$ and $\hat{b}$ are added in the ALU 28 of the machine 22 modulo n' to yield $\hat{c}=(\hat{a}+\hat{b})$mod n'. Conveniently, since the block Montgomery machine 22 operates using the modulus n', if there are carries stemming from the uppermost block when calculating $\hat{a}+\hat{b}$, the value will be sufficiently reduced by the automatic subtraction of the modulus n'.

Finally, in step 608, the Montgomery machine 22 retrieves the modulus n, and the value $\hat{c}$ is converted from Montgomery form to canonical form by computing the Montgomery multiplication:

$$\hat{c} \otimes 1 = ((\hat{a}+\hat{b}) \bmod n') R^{-1} \bmod n = ((a+b)R \bmod n') R^{-1} \bmod n = (a+b) \bmod n = c.$$

It will be appreciated that in the Montgomery multiplication steps described above, the final reduction step may be omitted, in which case the values may not be fully reduced, but will be congruent to the fully reduced value modulo n.

In the embodiments described above, the values $\mu$ and $R^2$ are first calculated and then used as precomputed values in a series of arithmetic operations in the Montgomery machine 22. The value $R^2$ is either fully reduced mod n or are congruent to the fully reduced value modulo n.

Figure 7:
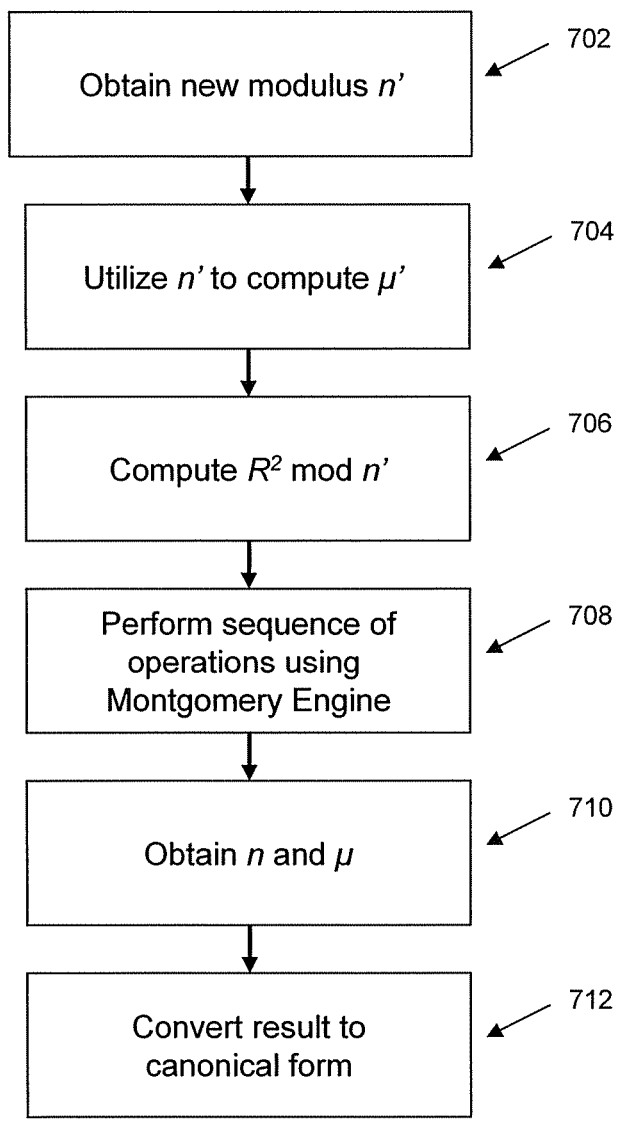
FIG. 7 is a schematic of an embodiment of a method of calculating a sequence of modular arithmetic operations.

FIG. 7 discloses an alternative embodiment in which all arithmetic operations (both additive and multiplicative) are performed using the shifted modulus n'. Whilst such a method may be disadvantageous in the sense that it is unnecessary to perform multiplicative operations using the shifted modulus n', such a method is beneficial in that it allows a series of arithmetic operations to be performed that accommodates the need for occasional reductions of either a carry or borrow from the upper block without switching between modulus n and shifted modulus n'.

First in step 702, the block-length modulus n' is retrieved from memory 30 or is calculated from n, for example, in the manner shown in step 302 of FIG. 3 or step 502 FIG. 5. For example, in one embodiment, the modulus n' is calculated by generating a number k and calculating n'=$(2^k+1)$n, where k is generated such that the bit length of n' is equal to the block length of the machine 22 (or a multiple thereof).

Next, in step 704, the block Montgomery machine 22 computes the value $\mu'=(-n')^{-1}$ mod $2^w$. Alternatively, this may instead be provided as an initial input to the machine 22 by the cryptographic module 18.

Then, in step 706, R=$2^r$ is obtained where r is the bit length of n', and cryptographic module 18 computes the value $R^2$ mod n' (or a value congruent to $R^2$ mod n' modulo n'). This is different from the embodiments described with reference to FIGS. 3 and 5, which compute $R^2$ mod n (or a value congruent to $R^2$ mod n modulo n). Specifically, to compute $R^2$ mod n', an add and multiply/square algorithm is applied, as is known in the art, but all operations in the Montgomery machine 22 (i.e. both the additive operations and the Montgomery multiplicative operations) are performed modulo n'.

Next, in step 708, the sequence of modular arithmetic operations are performed using the Montgomery machine 22. All operations are performed modulo n'. The canonical values are converted into Montgomery form using $R^2$ mod n' and intermediate results are stored in Montgomery faun in register file 26 as necessary. The precomputed value μ' is used by the machine 22 to perform the multiplicative operations. All operations in the sequence will be reduced modulo n', regardless of whether the operations are additive operations or multiplicative operations. If there are carries stemming from the uppermost block during any calculations, the value will be sufficiently reduced by the automatic addition or subtraction of the modulus n'.

Once the sequence of modular operations are complete, in step 710, the result, d̂, is stored (for example in register file 26) and the Montgomery machine 22 retrieves the original non-block-length modulus n. The corresponding μ is also calculated by (or provided to) the machine 22.

Finally, in step 712, the result, d̂, is converted from Montgomery form to canonical form by computing the Montgomery multiplication:

$$d̂ \otimes 1 = d̂R^{-1} \bmod n = (dR \bmod n')R^{-1} \bmod n = d \bmod n.$$

In view of the specific embodiments described with reference to FIGS. 1 to 7, FIG. 8 discloses generally a method for performing modular operations using a modulus n. The method is performed by a Montgomery machine having a fixed block length. The modulus n has a block length different from the fixed block length of the Montgomery machine or a multiple thereof. The method includes the following operations. First, in step 802, the Montgomery machine obtains a new modulus n' having a block length equal to the fixed block length of the Montgomery machine or a multiple thereof. For example, the new modulus n' can be obtained by operating on the modulus n to derive the new modulus n'. Next, in step 804, the Montgomery machine performs at least one modular additive operation with the new modulus n'. In this way, a carry stemming from the additive operation results in the reduction of the result of the additive operation by n'. Then, in step 806, the Montgomery machine performs at least one modular multiplicative operation with the modulus n.

Figure 8:
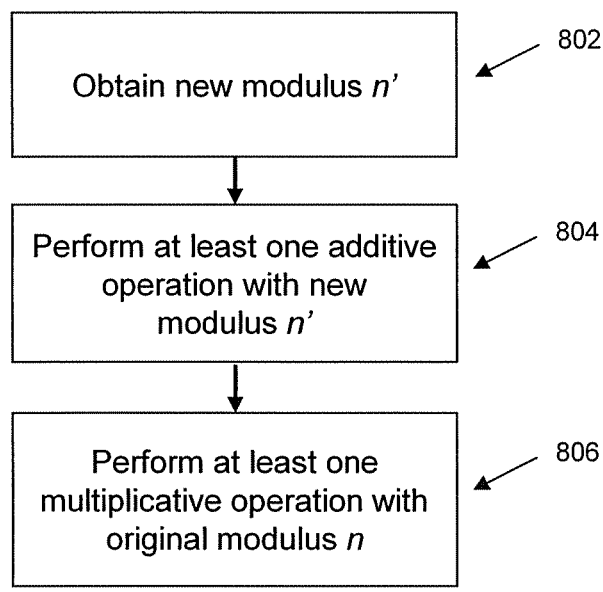
FIG. 8 is a schematic of an embodiment of a method of performing modular operations using a modulus n.

As an example, the additive and multiplicative operations performed in FIG. 8 can be used to compute $R^2$ mod n (or a value congruent to $R^2$ mod n modulo n). As another example, a result of the modular operations can be stored in memory (e.g. in memory 20 or 30) for subsequent retrieval by the Montgomery machine.

Although the above techniques have been described with reference to certain specific embodiments, various modifications thereof will be apparent to those skilled in the art without departing from the spirit and scope of the claims appended hereto.

The invention claimed is:

1. A method for performing modular operations using a modulus n in a cryptographic system, the method being performed by a computing device including a Montgomery machine having a fixed block length; the modulus n having a block length different from the fixed block length of the Montgomery machine or a multiple thereof; the method comprising:

the Montgomery machine obtaining a new modulus n' having a block length equal to the fixed block length of the Montgomery machine or a multiple thereof;

the Montgomery machine obtaining a value representative of a Montgomery radix R;

the Montgomery machine performing at least one modular additive operation with the new modulus n', whereby a carry stemming from the at least one modular additive operation results in reduction of a result of the at least one modular additive operation by n';

the Montgomery machine obtaining a value μ' of the form $μ' = (-n')^{-1} \bmod 2^w$, wherein w is an integer;

the Montgomery machine performing at least one modular multiplicative operation with the modulus n to convert a result of the modular operations out of Montgomery form; and the Montgomery machine storing the result of the modular operations in memory for subsequent retrieval by the Montgomery machine: and wherein the at least one modular multiplicative operation utilizes the value μ', and wherein the at least one modular additive operation is used in computing $R^2$ mod n' or a value congruent to $R^2$ mod n', and wherein the result of the modular operations is used to implement one or more cryptographic protocols in the cryptographic system.

2. The method of claim 1 wherein said obtaining a new modulus n' comprises the Montgomery machine operating on the modulus n to derive the new modulus n'.

3. The method of claim 2 wherein said operating on the modulus n to derive the new modulus n' comprises the Montgomery machine shifting the modulus n until a most-significant bit of a most-significant block of the modulus n is equal to one.

4. The method of claim 2 wherein the new modulus n' is of the form n'=kn, wherein k is an odd integer.

5. The method of claim 4 wherein k is randomly generated by the Montgomery machine.

6. The method of claim 2 wherein the new modulus n' is of the form $n' = (2^x + C) n$, wherein s and C are integers.

7. The method of claim 6 wherein C=1.

8. The method of claim 6 wherein s is randomly generated by the Montgomery machine.

9. A device including a memory and a Montgomery machine in a cryptographic system, the Montgomery machine having a fixed block length and used for performing modular operations using a modulus n, the modulus n having a block length different from the fixed block length of the Montgomery machine or a multiple thereof; the device configured to perform operations comprising:

the Montgomery machine obtaining a new modulus n' having a block length equal to the fixed block length of the Montgomery machine or a multiple thereof;

the Montgomery machine obtaining a value representative of a Montgomery radix R;

the Montgomery machine performing at least one modular additive operation with the new modulus n', whereby a carry stemming from the at least one modular additive operation results in reduction of a result of the at least one modular additive operation by n';

the Montgomery machine obtaining a value μ' of the form $μ' = (-n')^{-1} \bmod 2^w$, wherein w is an integer;

the Montgomery machine performing at least one modular multiplicative operation with the modulus n to convert a result of the modular operations out of Montgomery form; and the Montgomery machine storing the result of the modular operations in memory for subsequent retrieval by the Montgomery machine; and wherein the at least one modular multiplicative operation utilizes the value μ', and wherein the at least one modular additive operation is used in computing $R^2$ mod n' or a value congruent to $R^2$ mod n', and wherein the result of the modular operations is used to implement one or more cryptographic protocols in the cryptographic system.

10. The device of claim 9 wherein said obtaining a new modulus n' comprises the Montgomery machine operating on the modulus n to derive the new modulus n'.

11. The device of claim 10 wherein said operating on the modulus n to derive the new modulus n' comprises the Montgomery machine shifting the modulus n until a most-significant bit of a most-significant block of the modulus n is equal to one.

12. The device of claim 10 wherein the new modulus n' is of the form n'=kn, wherein k is an odd integer.

13. The device of claim 12 wherein k is randomly generated by the Montgomery machine.

14. The device of claim 10 wherein the new modulus n' is of the form n'=$(2^s+C)$n, wherein s and C are integers.

15. The device of claim 14 wherein C=1.

16. A non-transitory computer readable medium having stored thereon computer readable instructions for performing modular operations using a modulus n, the modular operations being performed by a Montgomery machine in a cryptographic system having a fixed block length; the modulus n having a block length different from the fixed block length of the Montgomery machine or a multiple thereof; the computer readable instructions comprising instructions for:

obtaining a new modulus n' having a block length equal to the fixed block length of the Montgomery machine or a multiple thereof;

the Montgomery machine obtaining a value representative of a Montgomery radix R;

performing at least one modular additive operation with the new modulus n', whereby a carry stemming from the at least one modular additive operation results in reduction of a result of the at least one modular additive operation by n';

the Montgomery machine obtaining a value μ' of the form μ'=$(-n')^{-1}$ mod $2^w$, wherein w is an integer;

performing at least one modular multiplicative operation with the modulus n to convert a result of the modular operations out of Montgomery form; and storing the result of the modular operations in memory for subsequent retrieval by the Montgomery machine: and wherein the at least one modular multiplicative operation utilizes the value μ', and wherein the at least one modular additive operation is used in computing $R^2$ mod n' or a value congruent to $R^2$ mod n', and wherein the result of the modular operations is used to implement one or more cryptographic protocols in the cryptographic system.

17. The non-transitory computer readable medium of claim 16 wherein said obtaining a new modulus n' comprises operating on the modulus n to derive the new modulus n'.

18. The non-transitory computer readable medium of claim 17 wherein the new modulus n' is of the form n'=kn, wherein k is an odd integer.

19. The non-transitory computer readable medium of claim 18 wherein k is randomly generated by the Montgomery machine.

20. The non-transitory computer readable medium of claim 17 wherein the new modulus n' is of the form n'=$(2^s+C)$n, wherein s and C are integers.

21. The non-transitory computer readable medium of claim 20 wherein C=1.

\* \* \* \* \*